(12) United States Patent
Haugen

(10) Patent No.: US 11,063,885 B2
(45) Date of Patent: *Jul. 13, 2021

(54) COMPACT ROUTER WITH REDUNDANCY

(71) Applicant: NEVION AS, Lysaker (NO)

(72) Inventor: Svein Havard Haugen, Tjodalyng (NO)

(73) Assignee: Nevian Europe AS ( * ) Notice: Subject to any disclaimer, the term of this patent is extended or adjusted under 35 U.S.C. 154(b) by 0 days.

This patent is subject to a terminal disclaimer.

(21) Appl. No.: 15/917,672

(22) Filed: Mar. 11, 2018

(65) Prior Publication Data

US 2018/0198737 A1 Jul. 12, 2018

Related U.S. Application Data

(63) Continuation of application No. 13/938,108, filed on Jul. 9, 2013, now Pat. No. 9,917,798.

(51) Int. Cl.
H04L 12/939 (2013.01)
H04L 12/703 (2013.01)

(52) U.S. Cl.
CPC ............ *H04L 49/557* (2013.01); *H04L 45/28* (2013.01)

(58) Field of Classification Search
None
See application file for complete search history.

(56) References Cited

U.S. PATENT DOCUMENTS

| 5,361,249 | A | * | 11/1994 | Monastra | H04L 49/557 370/217 |
| 5,365,511 | A | * | 11/1994 | Kusano | H04Q 11/04 340/2.21 |
| 5,870,028 | A | * | 2/1999 | Liron | H03K 17/6264 340/2.29 |
| 6,263,415 | B1 | * | 7/2001 | Venkitakrishnan | G06F 15/17381 370/406 |
| 6,636,169 | B1 | * | 10/2003 | Distinti | G06F 15/7867 341/126 |
| 7,552,262 | B1 | * | 6/2009 | Turner | H04L 49/10 370/351 |
| 8,199,672 | B1 | * | 6/2012 | Nachum | H04L 12/4013 370/254 |
| 8,611,257 | B1 | * | 12/2013 | Nachum | H04L 12/4013 370/255 |
| 2001/0030942 | A1 | * | 10/2001 | Suzuki | H04L 49/101 370/228 |

(Continued)

FOREIGN PATENT DOCUMENTS

| JP | 2008503117 A | 1/2008 |
| WO | 2006042207 A1 | 4/2006 |

OTHER PUBLICATIONS

Nevion.3G/HD/SD-SDI Video Routers in the VikinX Sublime series. User Manuel. Rev 21.
Analog Devices. Digital Crosspoint Switch with EQ 2007.

Primary Examiner — Gregory B Sefcheck
Assistant Examiner — Suk Jin Kang
(74) Attorney, Agent, or Firm — Paul D. Chancellor; Ocean Law

(57) ABSTRACT

A compact router with redundancy includes embodiments having main and backup crosspoint switching devices wherein one of the switching devices is removable from a main circuit board via a quick disconnect means such as an electrical connector.

10 Claims, 9 Drawing Sheets

(56) References Cited

U.S. PATENT DOCUMENTS

| | | | |
|---|---|---|---|
| 2002/0156940 A1* | 10/2002 | Meyer | H04L 45/00 710/1 |
| 2003/0142738 A1* | 7/2003 | Ho | H03K 3/0322 375/229 |
| 2003/0145108 A1* | 7/2003 | Joseph | H04L 29/06 709/239 |
| 2004/0085972 A1 | 5/2004 | Warren et al. | |
| 2005/0226148 A1* | 10/2005 | Assarpour | H04L 49/101 370/229 |
| 2006/0109782 A1 | 5/2006 | Ra et al. | |
| 2009/0064248 A1 | 3/2009 | Kwan et al. | |
| 2009/0108907 A1* | 4/2009 | Butler | H04N 7/108 327/387 |
| 2009/0121740 A1* | 5/2009 | Hauke | H04H 60/07 326/30 |
| 2009/0257360 A1 | 10/2009 | Patel et al. | |
| 2012/0120958 A1 | 5/2012 | Mahadevan et al. | |
| 2012/0019668 A1 | 12/2012 | Seth-Smith et al. | |
| 2013/0016606 A1 | 1/2013 | Cirkovic et al. | |
| 2013/0121692 A1* | 5/2013 | Patel | H04L 12/00 398/45 |
| 2013/0272113 A1* | 10/2013 | Sawaguchi | H04L 45/28 370/218 |
| 2013/0329130 A1* | 12/2013 | Gupta | H04N 5/21 348/497 |

* cited by examiner

500A

| STATE: Device Off | | | |
|---|---|---|---|
|  | On | Cold Standby | Off |
| Input Section |  |  | X |
| Main Crosspoint |  |  | X |
| Backup Crosspoint |  |  | X |
| Output Section |  |  | X |

| STATE: Main Crosspoint On, Backup Crosspoint in Cold Standby | | | |
|---|---|---|---|
|  | On | Cold Standby | Off |
| Input Section | X |  |  |
| Main Crosspoint | X |  |  |
| Backup Crosspoint |  | X |  |
| Output Section | X |  |  |

| STATE: Backup Crosspoint On, Main Crosspoint Off | | | |
|---|---|---|---|
| | On | Cold Standby | Off |
| Input Section | X | | |
| Main Crosspoint | | | X |
| Backup Crosspoint | X | | |
| Output Section | X | | |

| STATE: Backup Crosspoint On, Main Crosspoint in Cold Standby | | | |
|---|---|---|---|
| | On | Cold Standby | Off |
| Input Section | X | | |
| Main Crosspoint | | X | |
| Backup Crosspoint | X | | |
| Output Section | X | | |

FIG. 5D

COMPACT ROUTER WITH REDUNDANCY

PRIORITY CLAIM AND INCORPORATION BY REFERENCE

This application is a continuation of Ser. No. 13/938,108 filed Jul. 9, 2013 entitled Compact Router With Redundancy and which is incorporated herein in its entirety and for all purposes.

BACKGROUND OF THE INVENTION

Field of the Invention

The present invention relates to an article of manufacture. In particular, an electronic device for routing signals such as video signals includes a primary crosspoint switch and a redundant crosspoint switch.

Discussion of the Related Art

Signal routers typically include switches that can route signals from a particular input to one or more outputs. For example, the signal at router input 1 might be reproduced on router outputs 8 and 16. Core technologies enabling these devices include matrix switching technologies including crosspoint switches.

Digital signal routers are commonly used to manage transport of video signals such as broadcast video. These routers may be used continuously or infrequently, and they may support mission critical applications such as a master control room ("MCR") application or non-mission critical applications such as an off-line studio mixing application.

Digital video router designers and purchasers recognize the differing demands placed on routers. For example, routers provisioning applications such as remote sessions and backup routing may typically have available service intervals during which maintenance may be performed. However, routers provisioning other applications may have no service intervals. These mission critical routers without service intervals frequently support live feeds as compared with devices in applications where router failure does not affect a live feed, for example a router in a head-end back-up path. Varying demands have led to some video router product differentiation with hardened, high-reliability devices going to mission critical applications in 24/7 service without service intervals and less sophisticated devices going to less demanding applications.

In high-reliability devices, redundancy commonly provides fail-over protection preventing loss of service, while modularity with hot-swappable parts enables fail-over protection to be restored with only a short term service interruption. These 24/7 class video routers are often referred to as "modular routers" because of their ability to quickly exchange selected components or aggregations of components such as those assembled on a printed circuit board mated with other router electronics via a plug-in connector.

Unlike modular routers continuously serving live feeds, so called "compact" routers in non-mission critical applications typically dispense with high levels of redundancy and modularity. Rather, compact routers that fail are usually swapped out or removed from service during an out-of-service repair period. And, unlike modular routers, the electronic components of a compact router may be found on a single printed circuit board that is securely fastened to a router chassis.

Digital video routers commonly utilize a serial digital interface (SDI), a family of digital video interfaces standardized by SMPTE (The Society of Motion Picture and Television Engineers). For example, ITU-R BT.656 and SMPTE 259M define digital video interfaces used for broadcast-grade video.

SUMMARY OF THE INVENTION

The present invention provides a router with redundancy. Embodiments of the invention provide levels of redundancy intermediate between that found in high-end master control room routers with 24/7 availability requirements and less complex routers for application such as studio production. In various embodiments, a compact router provides appropriate levels of redundancy in outside broadcasting, infrastructure, and head-end applications.

In various embodiments, a compact router includes one or more of an optional redundant and replaceable crosspoint switching device, an optional signal processing module, direct web interface over IP and/or USB on a front panel, IP control, an external redundant controller option, a configurable touch panel user interface, power supply redundancy, one×four (1×4) sync distribution with passive loop, a 48 V DC power input, an RS 232 port for third party control interfaces, an RS 422 port for Flashlink™ integration, and HD-BNC or DIN 1.0/2.3 or BNC connectors.

In an embodiment, a signal routing device comprises: a compact SDI compliant router for routing video signals; the router including an input block having plural input ports and an output block having plural output ports; the router including a first crosspoint switch configured to interconnect selected input port(s) with selected output port(s); the router including a second crosspoint switch configured to interconnect selected input port(s) with selected output port(s); at least one of the crosspoint switches configured to substitute for the other when there is a threatened or actual crosspoint switching failure; before being called into service, the substituting crosspoint switch consuming less than all of its normal operating electric power so as to maintain the substituting switch in a relatively thermally cold state as compared with the non-substituting crosspoint switch; upon being called into service, the substituting crosspoint switch electric power consumption increases as it transitions from a cold state to an active state; and, wherein consumption of the lifetime of the electronics of the substituting crosspoint switch is reduced as compared with consumption of the lifetime of the electronics of the non-substituting crosspoint switch when the substituting switch is in a relatively thermally cold state and the non-substituting switch is interconnecting input and output ports. In various embodiments, reduced power consumption (consuming less than all of its normal operating electric power so as to maintain the substituting switch in a relatively thermally cold state) means consumption of about twenty five percent or less of the normal operating electric power. And, in various embodiments, reduced power consumption means consumption of about ten percent or less of the normal operating electric power.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIGS. 5A-D show state tables for embodiments of the router of FIG. 1.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, interposed devices including active devices may be located therebetween.

Figure 1:
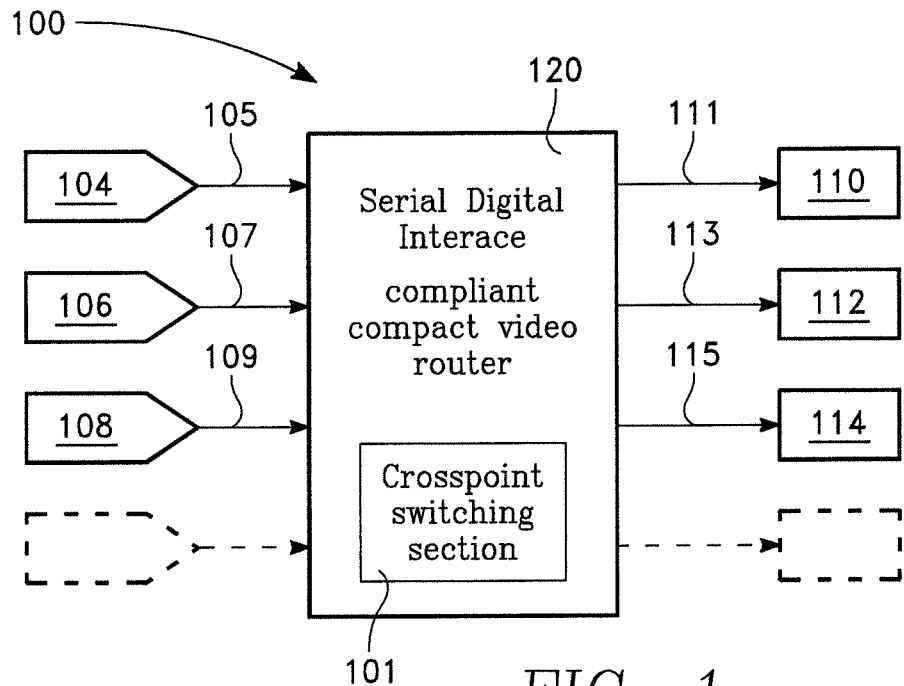
FIG. 1 shows an SDI compliant compact video router in accordance with the present invention.

FIG. 1 shows a video signal processing architecture 100. The architecture includes a digital router in accordance with the present invention. As shown, the digital router is a compact router 120 incorporating a crosspoint switching section 101.

In the crosspoint switching section 101, individual switches provide for interconnections between multiple inputs and multiple outputs. Crosspoint switching devices provide both square and rectangular switching matrixes of various sizes such as 64×64 devices and 64×128 devices. Because the switches are arranged in a matrix, a crosspoint switch with M inputs and N outputs provides a matrix with M×N cross-points or selective interconnections. At each crosspoint is a switch; when closed, it connects one of M inputs to one of N outputs. In various embodiments, a given crossing is a single layer, non-blocking switch where "non-blocking" means that other concurrent connections do not prevent connecting an arbitrary input to any arbitrary output. Collections of crosspoints can be used to implement multiple layer and/or blocking switches.

As seen, the router 120 receives signals from input sources 104, 106, 108 via respective input interconnections, such as input cables, 105, 107, 109 and outputs signals to output destinations 110, 112, 114 via respective output interconnections 111, 113, 115. In various embodiments, the inputs are SDI (serial digital interface) inputs and in various embodiments, the outputs are SDI outputs. SDI is a professional digital video interface standardized by SMPTE (The Society of Motion Picture and Television Engineers). As skilled artisans will understand, audio and video may be routed together in productions. For example, embodiments of the router 120 provide for switching both audio and video signals using means including audio embedded in a video signal and/or audio transported as AES3, a standard of the Audio Engineering Society.

In operation, the router 120 and its crosspoint switching section 101 provide a matrix type means for connecting multiple input sources 104, 106, 108, such as on and off-air feeds, eg., cameras, satellite links and the like, to multiple output destinations 110, 112, 114, eg., broadcast equipment, encoders and the like. And, in various embodiments, the crosspoint switching section enables an electronic switching fabric for interconnecting network nodes with each other via electronic switches.

Figure 2A:
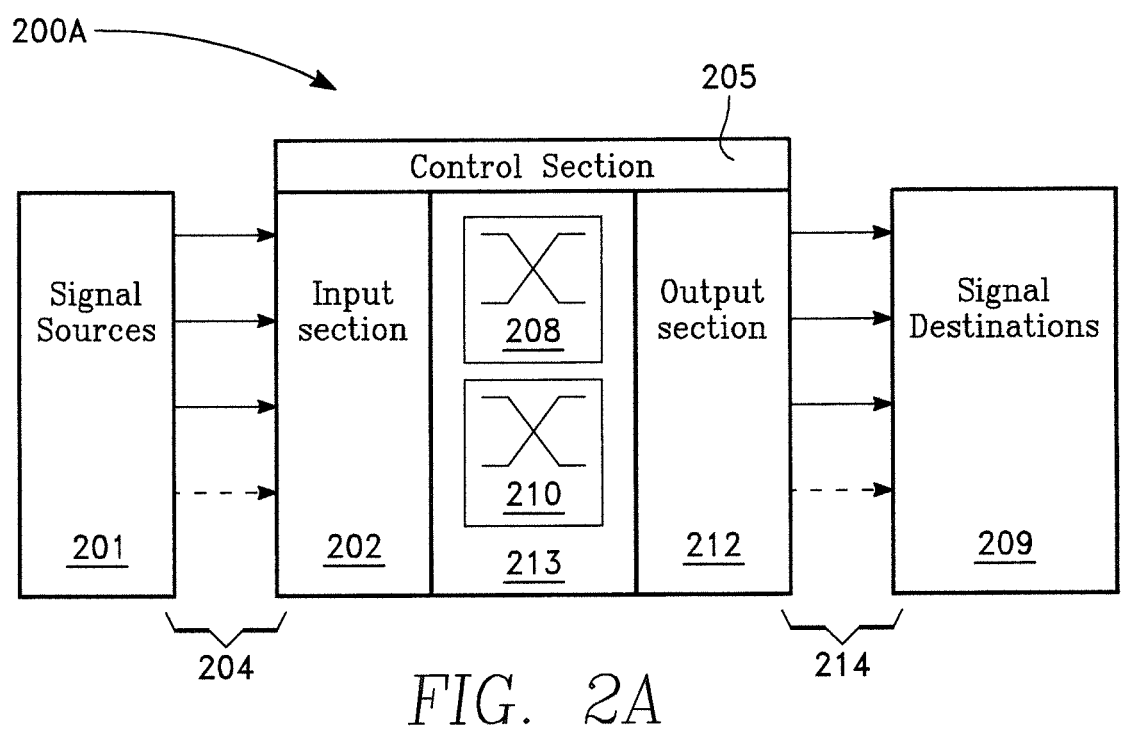
FIGS. 2A-E show block diagrams of embodiments of the router of FIG. 1.

FIG. 2A shows a block diagram of a compact router in accordance with the present invention 200A. An input section 202 receives signals 204 from signal sources 201. An output section 212 sends signals 214 to signal destinations 209. The input section communicates with the output section via a crosspoint switching section 213 including a main crosspoint switch 208 and a backup crosspoint switch 210. A control section 205 implements control and interface functions including control interfaces and control logic for operating the crosspoint switch. In various embodiments, the router provides clean-switching such that noise in transferred signals does not become a problem in a destination device, for example a legacy encoder in a head-end application. Some embodiments provide user configured outputs for selecting a clean output option to remove switching errors, for example a deglitcher in a 32×32 router may provide up to 8× clean outputs. And, in various embodiments a router control interface that is accessible from a web-browser is provided.

Persons of ordinary skill in the art will understand the use of physically distinct components for implementing router functions including any of input, output, switching, and control functions. Persons of ordinary skill in the art will also understand the use of physically distinct circuit boards, chassis, and/or enclosures used to secure router components. For example, a single semiconductor package or multiple semiconductor packages may include all or only some of these and other functions associated with routing signals.

Figure 2B:
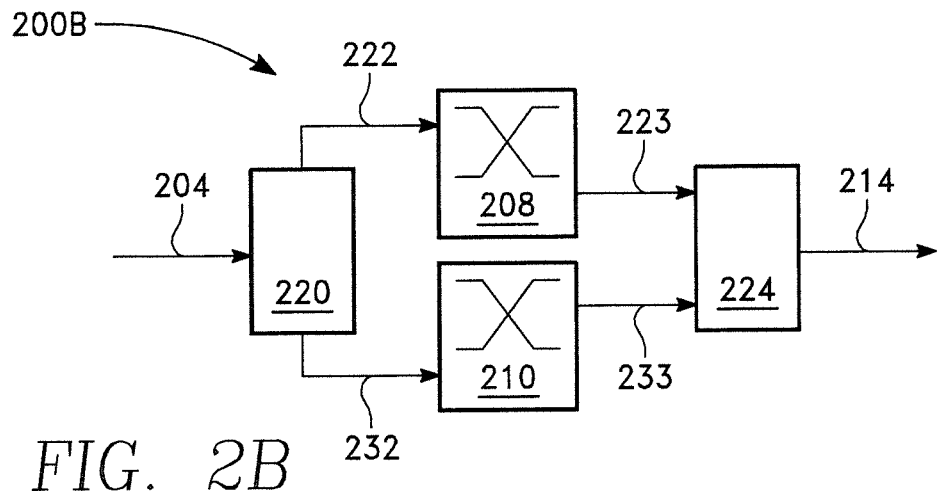

FIG. 2B shows a first ganged input/output device embodiment of the router of FIG. 2A 200B. Here, main and backup crosspoint switch device inputs are received from one device. Some embodiments utilizing this architecture include certain crosspoint switching devices packaged without input and output signal processing sections and certain crosspoint switching devices packaged with signal sharing devices such as dual output equalizers. For clarity, a single router channel is shown.

Main and backup crosspoint switching devices 208, 210 are interposed between input and output signal processing sections 220, 224. Here, the input signal processing section 220 serves as a signal splitter and provides dual outputs 222, 232 to the main and backup crosspoint switching devices 208, 210 respectively. An output signal processing section 224 receives outputs 223, 233 from the crosspoint switching devices 208, 210. The output of this signal processing section 214 makes the crosspoint switching device main and backup outputs available to a destination device, for example a television station live broadcast transmitter.

Figure 2C:
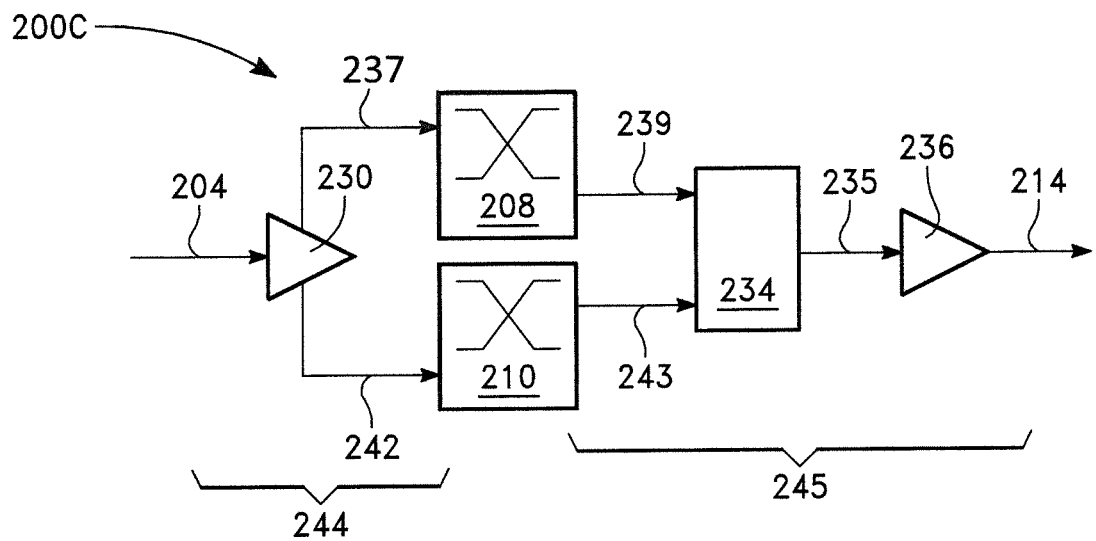

FIG. 2C shows a second ganged input/output device embodiment of the router of FIG. 2A 200C. Some embodiments utilizing this architecture include certain crosspoint switching devices packaged without input and output signal processing sections and certain crosspoint switching devices packaged with signal sharing devices such as dual output equalizers. For clarity, a single router channel is shown.

Main and backup crosspoint switching devices 208, 210 are interposed between input and output signal processing sections 244, 245. Here, the input signal processing section 244 includes an equalizer 230 for sharing an input signal 204 with dual equalizer outputs 237, 242. An output signal processing section 245 receives outputs 239, 243 from the crosspoint switching devices 208, 210. In an embodiment, the crosspoint switching device outputs are coupled with a reclocker 234 and an output driver 236 coupled with a reclocker output 235 provides a destination device output 214. And, in an embodiment, the crosspoint switching device outputs are coupled with a dual input driver (not shown) that provides a destination device output 214.

Figure 2D:
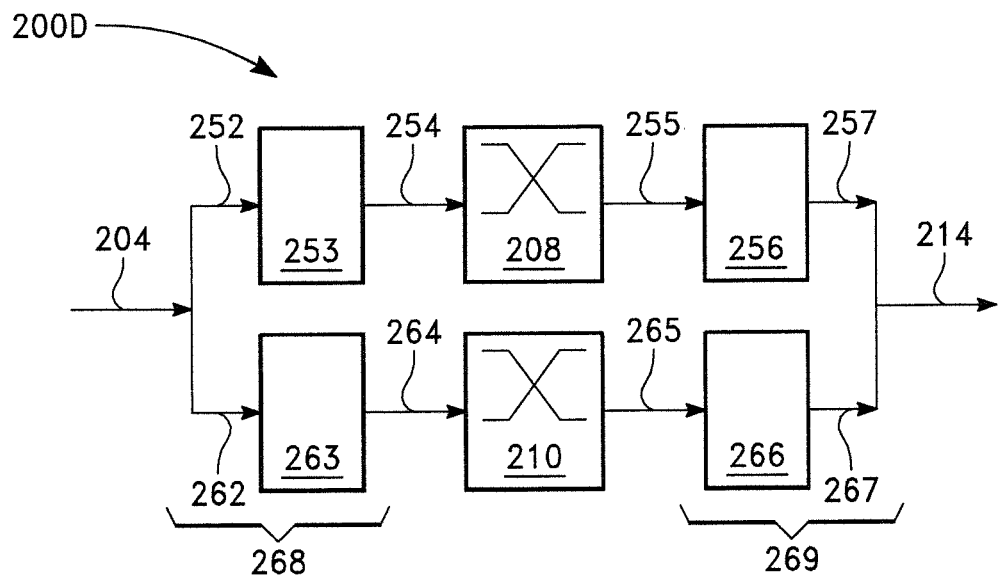

FIG. 2D shows a first isolated input/output device embodiment of the router of FIG. 2A 200D. Here, main and backup crosspoint switch device inputs are not ganged but are, for example, received from different devices. Some embodiments utilizing this architecture include certain crosspoint switching devices packaged with an isolated input signal processing section. See, for example, the Analog Devices Xstream line of products including the AD8156 digital crosspoint switch with equalizers.

Main and backup crosspoint switching devices 208, 210 are interposed between input and output signal processing sections 268, 269. Here, the input signal processing section 268 includes first and second input signal processors 253, 263 with inputs 252, 262 and outputs 254, 264. The outputs are coupled to respective crosspoint switching devices 208, 210. The output signal processing section 269 follows the crosspoint switching devices such that first and second output signal processors 256, 266 process respective crosspoint switching device output signals 255, 265 providing respective output signal processor outputs 257, 267 which are combined to provide a single destination device output 214.

Figure 2E:
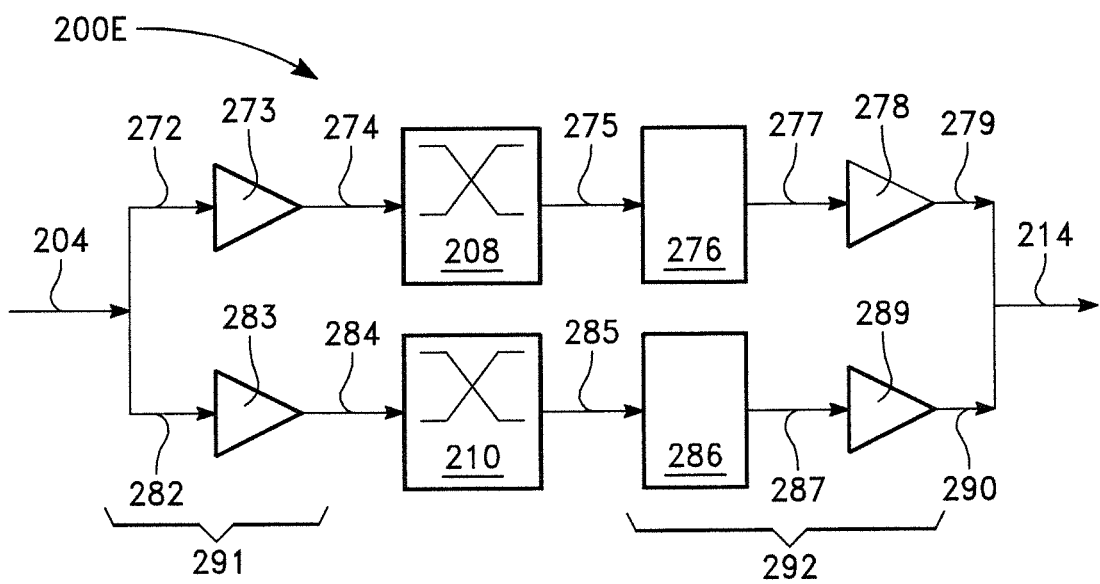

FIG. 2E shows a second isolated input/output device embodiment of the router of FIG. 2A 200E. Here, main and backup crosspoint switch device inputs are not ganged but are, for example, received from different devices. Some embodiments utilizing this architecture include certain crosspoint switching devices packaged with an isolated input signal processing section. See, for example, the Analog Devices Xstream line of products including the AD8156 digital crosspoint switch with equalizers.

Main and backup crosspoint switching devices 208, 210 are interposed between input and output signal processing sections 291, 292. Here, the input signal processing section 291 includes first and second input signal equalizers 273, 283 with inputs 272, 282 and outputs 274, 284. The outputs are coupled to respective crosspoint switching devices 208, 210. The output signal processing section 292 follows the crosspoint switching devices. In a first embodiment, respective reclockers 276, 286 with outputs 277, 287 are interposed between the crosspoint switching devices 208, 210 and output signal drivers 278, 289 with outputs 279, 290. Here, the crosspoint switching device outputs 275, 285 are coupled to respective reclockers 276, 286 while reclocker outputs are coupled to respective output circuit drivers 278, 289. Outputs of the circuit drivers are combined to provide a single destination device output 214.

Embodiments of the compact routers of FIGS. 2A-E include devices for processing signals entering and leaving crosspoint switching devices. While these signal processing devices may generally include equalizers in inputs and reclockers and/or drivers in outputs, persons of ordinary skill in the art will understand the exemplary nature of these circuits and the utility of different kinds of and different locations of signal processing components.

Figure 3:
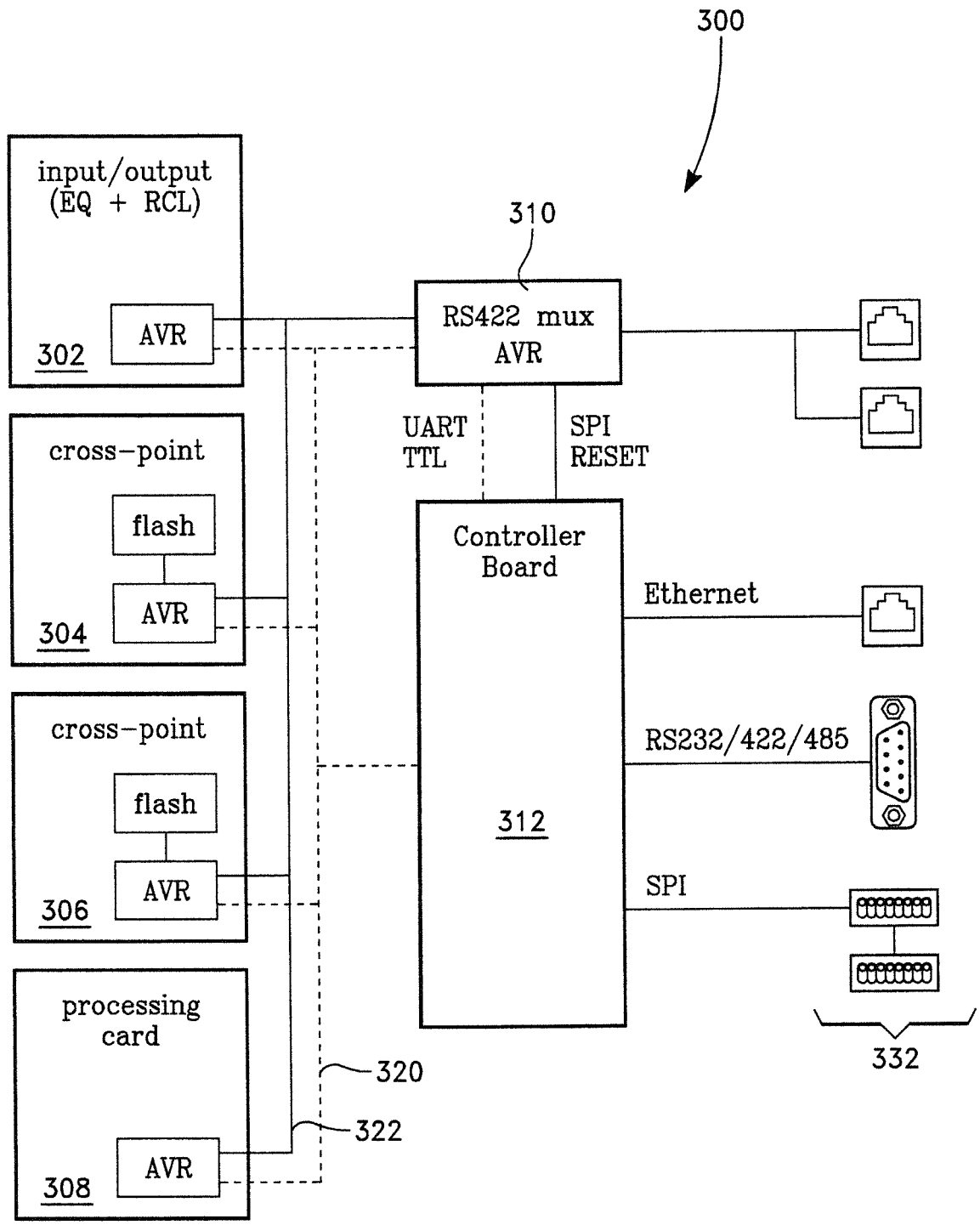
FIG. 3 illustrates communication paths in an embodiment of the router of FIG. 1.

FIG. 3 illustrates communication paths in an exemplary SDI compliant router of the present invention 300. Interconnected router sections include input/output signal processors including equalizers and reclockers 302, main crosspoint switch 304, backup crosspoint switch 306, router processor 308, router controller 312, communications multiplexor 310, and various control and data communications ports 332.

A control bus 320 provides a means for exchanging control signals with the router controller 312. In particular, the controller bus provides for signal exchange between the controller, the crosspoint switches 304, 306, the input/output processors 302, the router processor 308, and a communications multiplexor such as an RS 422 multiplexor 310. In various embodiments, AVR type reduced instruction set RISC microprocessors provide communications bus connections to each of the router sections.

A data bus 322 enables ingest, processing, and routing of video and in cases audio data as mentioned above. In particular, the data bus provides for signal exchange between the input/output processors 302, the crosspoint switches 304, 306, the router processor 308, and the communications multiplexor 310. In various embodiments, AVR type reduced instruction set RISC microprocessors provide communications bus connections to each of the router sections.

In various embodiments, a redundant controller implementation includes dual control paths to all router sections including crosspoints. Here, there is an RS422 path for an external redundant Multicon controller, support for redundant Ethernet connections, replaceable internal controller, and manual or automatic controller override.

Figure 4A:
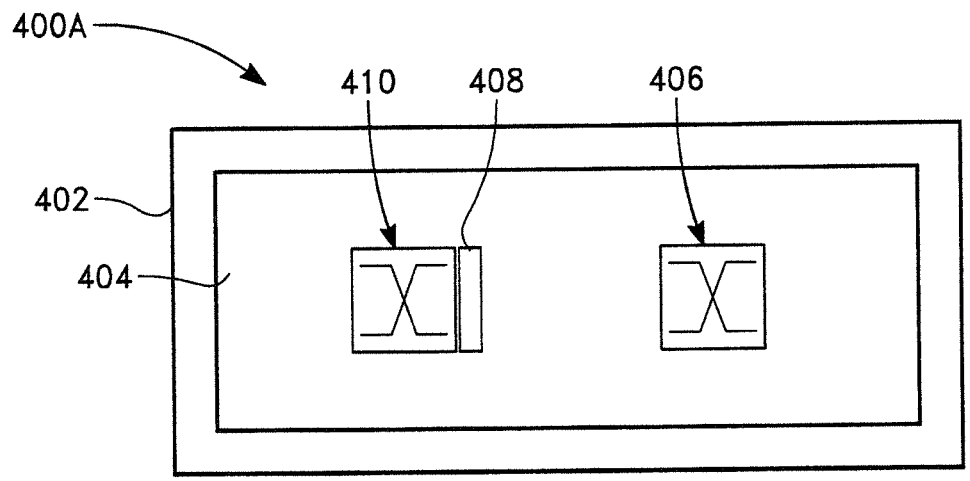
FIG. 4A shows a physical schematic of an embodiment of the router of FIG. 1.

FIG. 4A shows a schematic of an SDI compliant, compact digital router in accordance with embodiments of the present invention 400A. As shown, a chassis 402 supports a printed circuit board such as a main circuit board 404 that interconnects with an irremovable crosspoint switch 406 and a removable crosspoint switch 410. Irremovable refers to a permanent affixation such as a soldered in place surface mount integrated circuit. In an embodiment, a chassis is configured to support a main circuit board; the backup crosspoint switch has an irremovable fixation to the main circuit board; the main crosspoint switch has a removable fixation to the main circuit board via a connector; and, the main crosspoint switch connector is configured to facilitate removal and replacement of the main crosspoint switch.

In particular, the irremovable crosspoint switch and/or switch assembly 406 is affixed to the printed circuit board 404 as by soldering or by another irremovable means known to persons of ordinary skill in the art. But, the removable crosspoint switch 410 is removably affixed to the printed circuit board as by a selectively engageable interface 408. In various embodiments, the selectively engageable interface includes a pin type and/or edge type connector. Embodiments of the router 400A provide access to the removable crosspoint 410 and other removable parts such as a daughter board mounted processor via a removable, sliding, articulated, or other similar feature or cover 420 that is accessible from the outside of the router. In an embodiment, a removable chassis cover plate provides access for removal and replacement of the main crosspoint switch without removing the chassis from the router.

Figure 4B:
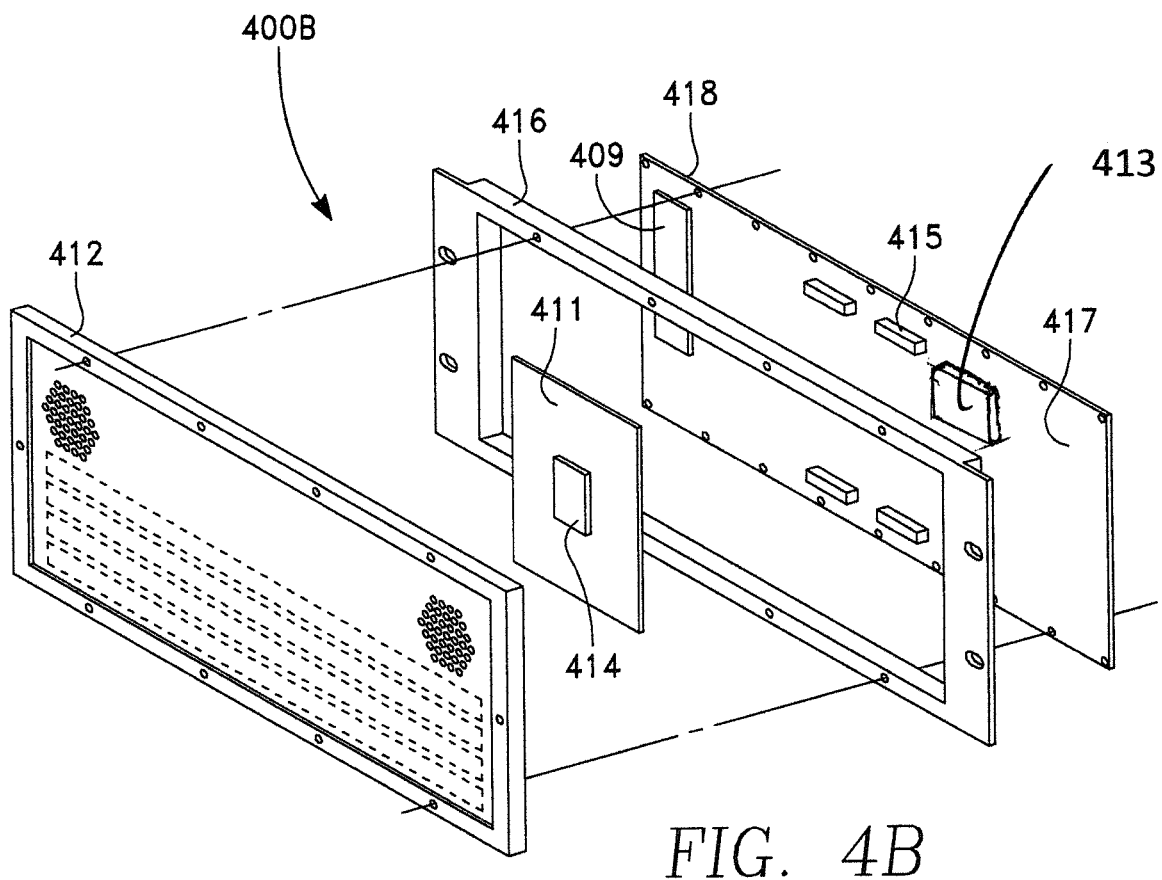
FIGS. 4B-C show perspective views of embodiments of the router of FIG. 1.
Figure 4C:
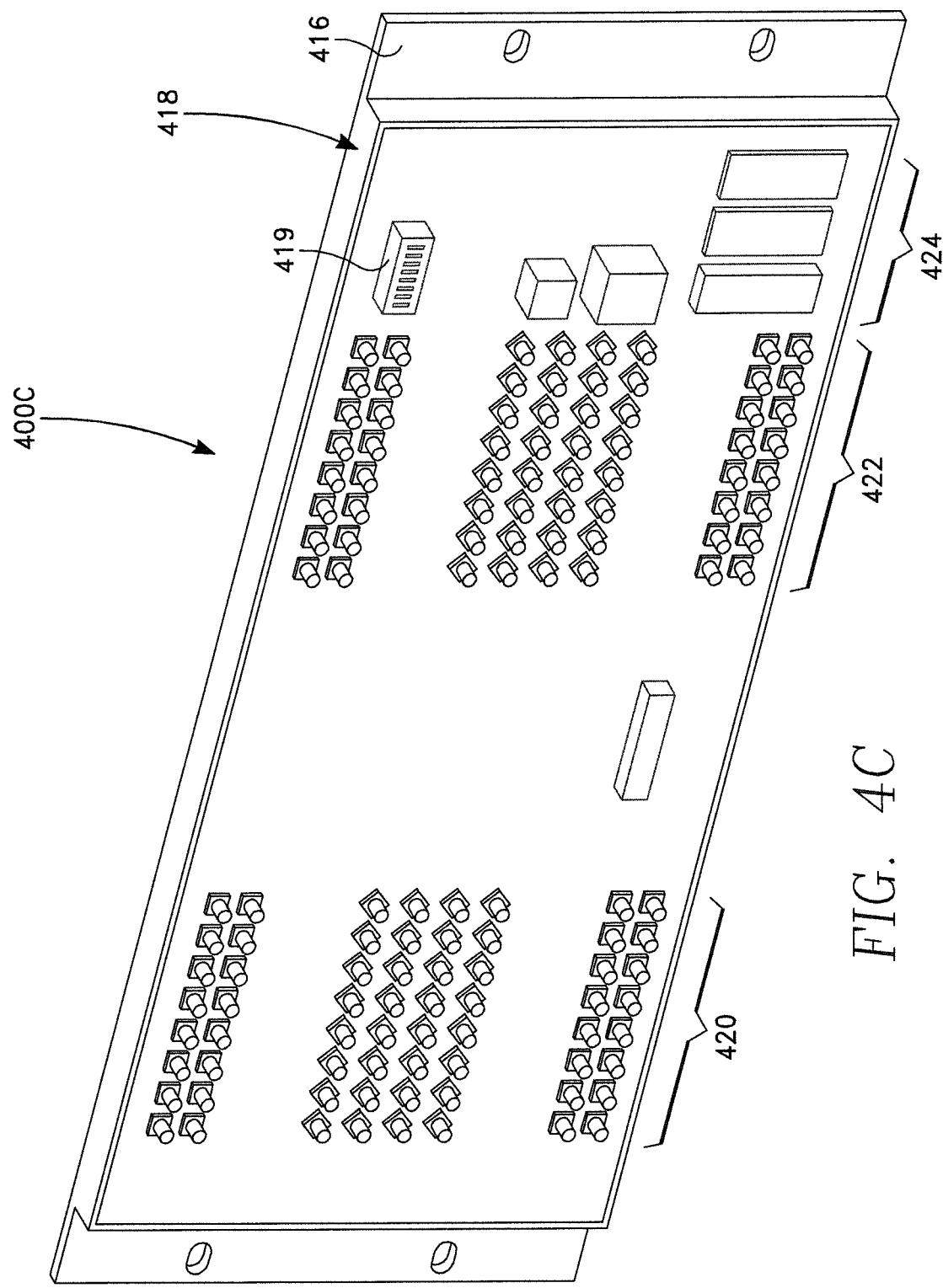

FIGS. 4B and 4C show perspective views of an SDI compliant, compact digital router in accordance with embodiments of the present invention 400 B, C. In particular, a compact router includes a front cover 412, an intermediate chassis 416, and a backplane 418 with an internal side 417 and an external side 419.

On its internal side, the backplane incorporates a backup crosspoint switching device 413 and provides one or more connectors 415 for receiving a removable daughter board 414 on which a main crosspoint switching device 411 is mounted. A router processor board 409 is also coupled to the backplane internal side via a suitable connector. As skilled artisans will understand, connector mounted daughter boards can be, as here, configured for quick access and exchange.

The external backplane side provides connections such as female BNC type connections for receiving connecting cable connections, for example coaxial cable connections 420, 422. The external backplane side also provides data and control connections 424 including one or more of Ethernet connections RS 232 connections, RS 422 connections, and the like.

The SDI compliant compact router described above is configured to provide redundancy with a backup crosspoint switching device. Embodiments are configured for ease of maintenance with easily accessible and connector mounted components such as a daughter board mounted main crosspoint switching device and a daughter board mounted router processor.

As described below, operating features of embodiments of the router disclosed herein further enhance router reliability. In particular, it is noted that electronic device lifetime is consumed more rapidly as the device operating temperature increases. By some estimates, an increase of ten degrees centigrade reduces device lifetime by one half. For example, a device operating at 50 degrees centigrade with a projected life of 10 years will last for only 5 years if operated at 60 degrees centigrade.

The router state tables of FIGS. 5A-D show operating states of an embodiment of the compact router of the present invention 500A-D. These operating states enable management of router operating temperatures to extend the life of router components, in particular the life of a standby crosspoint switching device awaiting service upon failure of an operating crosspoint switching device.

FIG. 5A shows a router state table when the router is in the "device off" state 500A. In the device off state, the router input section, main crosspoint switching device, backup crosspoint switching device, and output section are off. As used in the state tables, the term "off" refers to a deprivation of electric power such as complete deprivation or deprivation to an extent preventing normal operation. In cases where a removable crosspoint is off, the term off includes instances when the crosspoint has been removed.

FIG. 5B shows a router state table when the router is in a "main crosspoint switching device on, backup crosspoint switching device in cold standby" state 500B. In this main on, backup in cold standby state, the router input section, main crosspoint switching device, and output sections are on while the backup crosspoint switching device is off. As used in the state tables, the term "on" refers to a supply of electric power sufficient for normal operation. And, as used in the state tables, the term "cold standby" refers to a complete deprivation of electric power (completely off) or a deprivation of electric power consistent with a reduced consumption operating mode (less than normal operating mode power).

FIG. 5C shows a router state table when the router is in a "backup crosspoint on, main crosspoint off" state 500C. In this backup on, main off state, the router input section, backup crosspoint switching device, and router output section are on while the main crosspoint switching device is off.

FIG. 5D shows a router state table when the router is in a "backup crosspoint on, main crosspoint in cold standby" state 500D. In this backup on, main in cold standby state, the router input and output sections are on while the main crosspoint switching device is in cold standby while the backup crosspoint switching device is off.

Persons of ordinary skill in the art will understand that while various router states have been described, they are by no means all inclusive. For example, other states known to skilled artisans may be used to accomplish the goals of the invention.

The disclosure above explains the use of crosspoint switching device states that achieve redundancy and increase crosspoint switching device lifetime. Notably, crosspoint switching device states may be implemented in routers with two crosspoint switching devices as suggested above and also in larger routers with more than two crosspoint switching devices.

In an embodiment, crosspoint redundancy for smaller switches such as 32×32 and 64×64 is "full" crosspoint redundancy wherein all router switching is carried out by a single crosspoint switching device and redundancy means all router throughput moves, automatically or manually, from a main crosspoint switching device to a backup crosspoint switching device. In various embodiments separate controllers support the main and backup crosspoints.

In another embodiment, crosspoint redundancy for smaller switches such as 128×128 is "segmented" crosspoint redundancy wherein not all router switching is carried out by a single crosspoint switching device and redundancy means not all router throughput moves from a main crosspoint switching device to a backup crosspoint switching device. Rather, router switching is carried out by multiple crosspoint switching devices and redundancy means only a portion of router throughput moves, automatically or manually, from a main crosspoint switching device to a backup crosspoint switching device. As skilled artisans will appreciate, this configuration requires that a failed crosspoint switching device be identifiable from among multiple active crosspoint switching devices. In various embodiments, each crosspoint switching device is coupled to a respective controller.

Persons of ordinary skill in the art will understand that while various router states have been described, they are by no means all inclusive. For example, other states known to skilled artisans may be used to accomplish the goals of the invention.

As mentioned above, size ranges of embodiments of the present invention vary. In an embodiment, a 32×32 router consumes about 30 watts without processing and redundant crosspoint. This router occupies two rack units and incorporates a 40×40 crosspoint switching device, has eight processing inputs to the crosspoint, eight processing outputs from the crosspoint, and provides an optional fully redundant crosspoint. In an embodiment, a 64×64 router consumes about 55 watts without processing and redundant crosspoint. This router occupies three rack units and incorporates an 80×80 crosspoint switching device, has sixteen processing inputs to the crosspoint, sixteen processing outputs from the crosspoint, and provides an optional fully redundant crosspoint. In an embodiment, a 128×128 router consumes about 110 watts without processing and redundant crosspoint. This router occupies six rack units and incorporates a 160×160 crosspoint switching device, has two×eight (2×8) processing inputs to the crosspoint, two×eight (2×8)

processing outputs from the crosspoint, and provides an optional fully redundant crosspoint.

Figure 6:
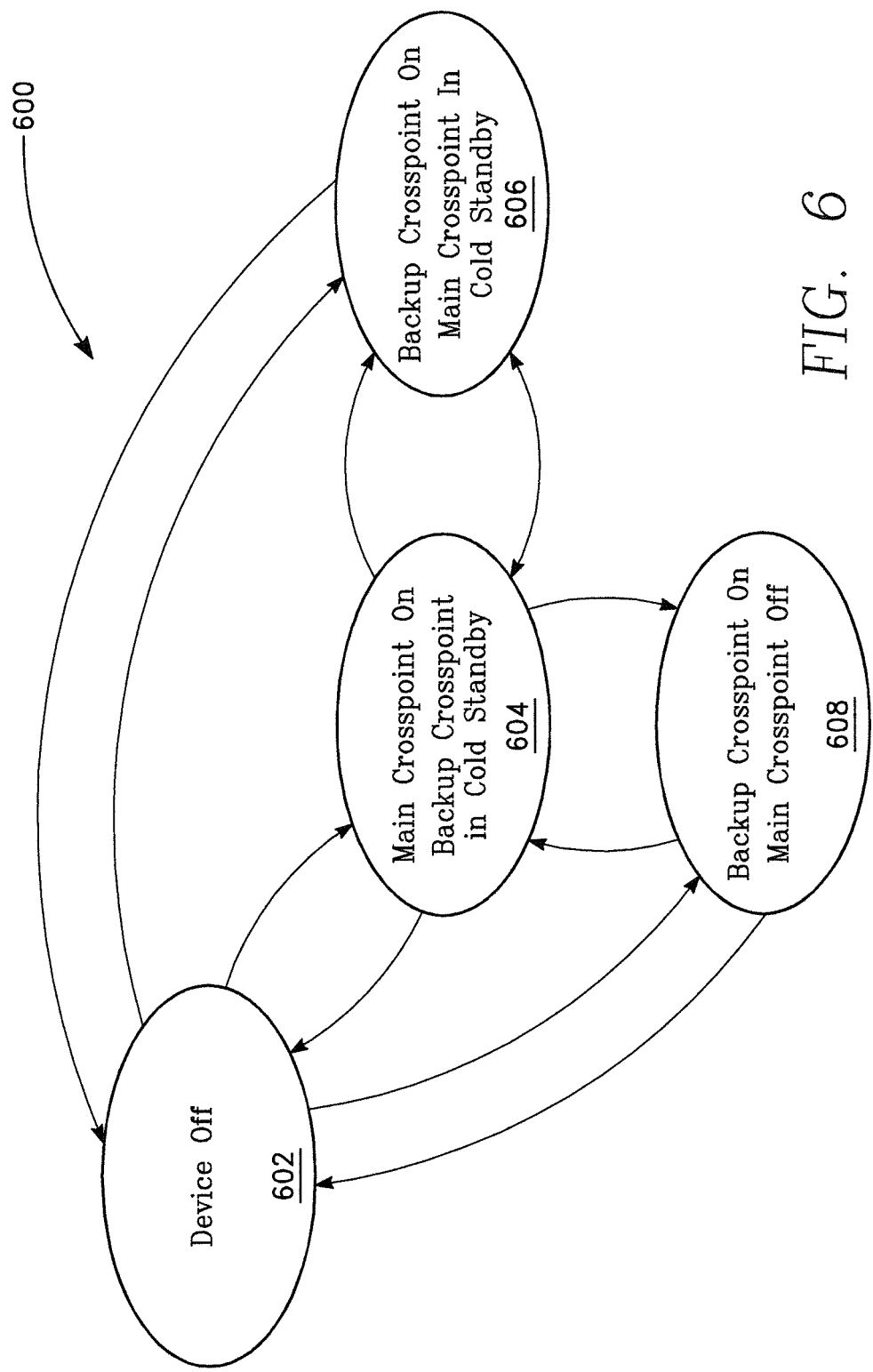
FIG. 6 shows a state diagram for embodiments of the router of FIG. 1.

FIG. 6 shows a state diagram for a router embodiment contemplated by the present invention 600. In particular, routing states are similar to those described above and include the following states.

a. Device off 602 b. Main crosspoint on, backup crosspoint in cold standby 604 c. Backup crosspoint on, main crosspoint in cold standby 606 d. Backup crosspoint on, main crosspoint off 608

As shown in the state diagram, the router can transition from the off state to main on, backup standby and to backup on, main standby states. From the main on, backup standby state, the router can transition to any of the remaining states. From the backup on, main standby state, the router can transition to main on, backup standby and device off states. From the backup on, main off state, the router can transition to main on, backup standby and device off states.

Exemplary operating modes include a lifetime preserving operating mode, a backup operating mode, and a service interval mode. In particular: in a first lifetime preserving operating mode, the main crosspoint operates while the backup crosspoint is in standby; in a backup operating mode, the backup crosspoint operates while the main crosspoint is in standby or is being replaced; and, in a service interval mode, the main crosspoint and backup crosspoint are in standby or off. For example, in a service interval mode where the main crosspoint is not a hot swappable device, then the router and its main and backup crosspoints are off.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A signal routing device comprising:
    a compact router for routing digital video signals, the router having plural input ports and plural output ports;
    the router including a main crosspoint switch for interconnecting input and output ports during normal mode operations;
    the router including a backup crosspoint switch for interconnecting input and output ports during backup mode operations;
    a chassis and a main circuit board, the main crosspoint switch having a removable fixation to the main circuit board via a connector that facilitates removal and replacement of the main crosspoint switch;
    the router configured to maintain the backup crosspoint switch in a relatively thermally cold state as compared to the main crosspoint switch when the router is interconnecting input and output ports during the normal operating mode;
    in the relatively thermally cold state, the backup crosspoint switch i) inoperative to route video signals and ii) consuming power from an electric power source;
    the router configured to increase the supply of electric power to the backup crosspoint switch upon a main crosspoint switch malfunction; and,
    upon a main crosspoint switch malfunction, the router configured to substitute switching functions of the backup crosspoint switch for switching functions of the main crosspoint switch.

2. The signal routing device of claim 1 further comprising:
    unswitched connections at the crosspoint switches;
    no detection of traffic on crosspoint switch connections;
    a controller and a serial communications multiplexor;
    a controller bus coupled to each of the main crosspoint switch, the communications multiplexor, and the backup crosspoint switch;
    a communications bus coupled to each of the main crosspoint switch and the backup crosspoint switch; and,
    the controller configured for signal communications with the communications multiplexor.

3. The signal routing device of claim 2 further comprising:
    an equalizer having an input for an SDI compliant video signal and dual outputs;
    a first equalizer output coupled to the main crosspoint switch; and,
    a second equalizer output coupled to the backup crosspoint switch.

4. The signal routing device of claim 2 further comprising:
    the controller bus coupled to a processor; and,
    the communications bus coupled to the processor.

5. The signal routing device of claim 1 wherein the backup crosspoint switch is irremovably fixed to the main circuit board.

6. The signal routing device of claim 5 further comprising:
    a removable chassis cover plate that provides access to the main crosspoint switch; and,
    the cover plate configured to allow removal of the main crosspoint switch without the need for removal of the chassis from the router.

7. The signal routing device of claim 1 further comprising:
    an input section including the input ports and an output section including the output ports;
    the input section including input port equalizers for interfacing varying input loads with the router inputs; and,
    the output section including output port drivers for interfacing varying output loads with the router outputs.

8. The signal routing device of claim 7 further comprising a reclocking device associated with each router output port.

9. The signal routing device of claim 7 wherein input equalizers and output drivers are copackaged with the backup crosspoint switch and a single router controller signal enables the backup crosspoint switch and associated input equalizers and output drivers to route video signals.

10. The signal routing device of claim 7 wherein input equalizers are not packaged with the backup crosspoint switch and plural router controller signals enable the backup crosspoint switch and associated input equalizers to route video signals.

* * * * *